United States Patent
Colange et al.

(10) Patent No.: US 11,274,208 B2
(45) Date of Patent: Mar. 15, 2022

(54) REDUCING CRUMB RUBBER MODIFIED BITUMEN ODORS

(71) Applicant: SHELL OIL COMPANY, Houston, TX (US)

(72) Inventors: Jacques Colange, Colombes (FR); Liting Xu, Shanghai (CN); Hui Yan, Beijing (CN)

(73) Assignee: SHELL OIL COMPANY, Houston, TX (US)

( * ) Notice: Subject to any disclaimer, the term of this patent is extended or adjusted under 35 U.S.C. 154(b) by 444 days.

(21) Appl. No.: 16/340,754

(22) PCT Filed: Oct. 11, 2017

(86) PCT No.: PCT/CN2017/105722
§ 371 (c)(1),
(2) Date: Apr. 10, 2019

(87) PCT Pub. No.: WO2018/068732
PCT Pub. Date: Apr. 19, 2018

(65) Prior Publication Data
US 2021/0284844 A1 Sep. 16, 2021

(30) Foreign Application Priority Data
Oct. 12, 2016 (WO) ................ PCT/CN2016/101908

(51) Int. Cl.
*C08L 95/00* (2006.01)
*C08L 17/00* (2006.01)

(52) U.S. Cl.
CPC ............. *C08L 95/00* (2013.01); *C08L 17/00* (2013.01); *C08L 2205/035* (2013.01); *C08L 2555/34* (2013.01); *C08L 2555/64* (2013.01); *C08L 2555/72* (2013.01); *C08L 2555/86* (2013.01)

(58) Field of Classification Search
CPC ..... C04B 2111/0075; C04B 2103/0076; C04B 24/045; C04B 24/36; C04B 18/22; C08K 5/04; C08K 5/05; C08K 5/07; C08L 17/00; C08L 91/00; C08L 95/00; C08L 95/005
See application file for complete search history.

(56) References Cited

U.S. PATENT DOCUMENTS

| | | | |
|---|---|---|---|
| 6,461,421 B1 | 10/2002 | Ronvak | |
| 8,425,678 B2 | 4/2013 | Quinn et al. | |
| 2009/0314184 A1 | 12/2009 | Quinn et al. | |
| 2011/0184090 A1* | 7/2011 | De Jonge | C08L 95/00 523/351 |

FOREIGN PATENT DOCUMENTS

| | | | | |
|---|---|---|---|---|
| CA | 2695829 A1 * | 2/2009 | | C08K 5/04 |
| CN | 101080450 A | 11/2007 | | |
| CN | 101205452 A | 6/2008 | | |
| CN | 101842426 A | 9/2010 | | |
| CN | 102131857 A | 7/2011 | | |
| CN | 102634214 A | 8/2012 | | |
| GB | 1272584 A | 5/1972 | | |
| JP | H0328253 A | 2/1991 | | |
| JP | 2005187805 A | 7/2005 | | |
| JP | 4762687 B2 | 8/2011 | | |
| WO | 2004099352 A2 | 11/2004 | | |
| WO | WO-2009019041 A1 * | 2/2009 | | C08K 5/04 |
| WO | 2011070446 A1 | 6/2011 | | |

OTHER PUBLICATIONS

Presti, "Recycled Tyre Rubber Modified Bitumens for Road Asphalt Mixtures: a Literature Review", Construction and Building Materials, vol. 49, 2013, pp. 863-881.
Herrington et al., "Removing Barriers to the Use of Crumb Rubber in Roads", Opus Research, Nov. 2015, 51 pages.
International Search Report and Written Opinion received for PCT Patent Application No. PCT/CN2017/105722, dated Jan. 11, 2018, 10 pages.
International Search Report and Written Opinion received for PCT Patent Application No. PCT/CN2017/105711, dated Jan. 11, 2018, 11 pages.

* cited by examiner

*Primary Examiner* — Christopher M Rodd
(74) *Attorney, Agent, or Firm* — Shell Oil Company

(57) ABSTRACT

A method for reducing odors including the steps of admixing active agents and a diluting agent to liquid crumb rubber modified bitumen, wherein the active agents comprise 20 to 60 wt.-% of an aldehyde selected from alpha-hexyl cinnamaldehyde, 2-(4-tert.-butylbenzyl) propionaldehyde, 2-benzylidenheptanal, or mixtures thereof, and 10 to 40 wt.-% of one or more alcohols having a boiling point of at least 150° C., calculated on the total weight of active agents. A crumb rubber modified bitumen composition as obtained by the method above. The use of a crumb rubber modified bitumen composition as obtained by the method above in road surfacing and road base materials, in insulating layers for buildings, in roofing materials and/or in sealing sheeting.

13 Claims, No Drawings

REDUCING CRUMB RUBBER MODIFIED BITUMEN ODORS

CROSS REFERENCE TO EARLIER APPLICATION

The present application is the National Stage (§371) of International Application No. PCT/CN2017/105722, filed Oct. 11, 2017, which claims priority from CN Application No. PCT/CN2016/101908, filed Oct. 12, 2016, incorporated herein by reference.

FIELD OF THE INVENTION

The invention relates to a method for reducing odors in compositions comprising crumb rubber modified bitumen. The odors are reduced by admixing active agents.

BACKGROUND TO THE INVENTION

Bitumen is a viscous liquid or a solid consisting essentially of hydrocarbons and their derivatives. It is soluble in trichloroethylene and softens gradually when heated.

Bitumen is used on an industrial scale, e.g. in road surfacing and road base materials, in insulating layers for buildings, in sealing sheeting, and in roofing materials such as roofing membranes, felts and shingles. Especially when used to pave roads or other surfaces, bitumen may be combined with mineral aggregate to form asphalt concrete. Mineral aggregate may comprise sand, gravel, (crushed) stones, slag, recycled concrete and/or geosynthetic aggregates. In one method to prepare asphalt concrete, mineral aggregate and crumb rubber are combined, and then bitumen is added during the asphalt production process.

Crumb rubber, also referred to as Ground Tire Rubber, comprises particles of rubber which are typically obtained from used vehicle tires. Incorporating crumb rubber into bitumen is a sustainable means of reducing the number of tires which are disposed of. The crumb rubber can also improve the properties of the bitumen.

Crumb rubber can be mixed with or mechanically dispersed in bitumen, after which it may be used on an industrial scale.

Bitumen comprising crumb rubber may also be referred to as Crumb Rubber Modified Bitumen (CRMB).

In many applications, CRMB is processed in softened or in liquefied form. At the processing temperatures, which are above 100° C., often above 140° C. or even as high as 200° C., volatile substances present in CRMB may be released to the air. Especially sulfur and nitrogen compounds may lead to foul odors.

There is a need for a method to reduce odor when processing crumb rubber modified bitumen.

SUMMARY OF THE INVENTION

EP2185640B1 (AU2008285878B2) describes a method for reducing bitumen odors. Active agents and a diluting agent are admixed to liquid bitumen. EP2185640B1 refers to the use of this method for common commercial bitumen which may contain residues from crude oil distillation as well as residues that were obtained by means of a cracking process. It also refers to naturally occurring bitumen and mixtures of various types of bitumen. Examples provided are straight-run asphaltic bitumen, precipitation bitumen, e.g. propane bitumen, oxidized bitumen, naphthene-base bitumen and mixtures thereof. Well-suited bitumen can also be produced by mixing with a naphthene base or paraffin base flux oil or a vegetable oil. It can just as well contain a polymer such that a polymer-modified bitumen is generated. Well-suited polymers include thermoplastic elastomers or plastomers, such as, e.g. styrene block copolymers and/or olefin copolymers such as ethylene/vinylacetate copolymer.

The bitumen prepared according to the method described in EP2185640B1 can be used on an industrial scale, e.g. in road surfacing and road base materials, in insulating layers for buildings, such as insulating layers against the penetration of water and moisture into buildings, in sealing sheeting, and in roofing materials such as roofing membranes, felts and shingles. Especially when used to pave roads or other surfaces, the bitumen prepared according to the method described in EP2185640B1 may be combined with mineral aggregate to form asphalt concrete. Mineral aggregate may comprise sand, gravel, (crushed) stones, slag, recycled concrete and/or geosynthetic aggregates. In one method to prepare asphalt concrete, mineral aggregate and crumb rubber are combined, and then bitumen prepared according to the method described in EP2185640B1 is added during an asphalt production process.

As mentioned above in the background section, crumb rubber can be incorporated into bitumen, for example by mixing or by mechanically dispersing it into the bitumen, after which it may be used on an industrial scale, e.g. in road surfacing and road base materials, in sealing sheeting, in insulating layers for buildings, and for the production of roofing materials such as roofing membranes, felts and shingles.

Bitumen comprising crumb rubber may also be referred to as Crumb Rubber Modified Bitumen (CRMB). The CRMB may be used as such, or other materials may be added to it. For example, mineral aggregate may be added to CRMB to form asphalt concrete.

It has now been found that the method described in EP2185640B1 can also be applied to Crumb Rubber Modified Bitumen to reduce odor.

The present invention relates to a method for reducing odors including the steps of admixing active agents and a diluting agent to liquid crumb rubber modified bitumen, wherein the active agents comprise:

A: 20 to 60 wt.-% of aldehyde(s) selected from:
  A1. alpha-hexyl cinnamaldehyde,
  A2. 2-(4-tert.-butylbenzyl) propionaldehyde,
  A3. 2-benzylidenheptanal,
  or mixtures thereof, B: 0 to 20 wt.-% of one or more other aldehydes having at least 10 carbon atoms in the molecule, C: 10 to 40 wt.-% of one or more alcohols having a boiling point of at least 150° C., D: 0 to 20 wt.-% of one or more terpenes having a boiling point of at least 150° C., E: 0 to 10 wt.-% of ketone(s) having a boiling point of at least 150° C., F: 0 to 10 wt.-% of carbonic acid ester(s), calculated on the total weight of active agents.

The invention further relates to a crumb rubber modified bitumen composition as obtained by the method of the invention.

The invention also relates to the use of a crumb rubber modified bitumen composition as obtained by the invention in road surfacing and road base materials, in insulating layers for buildings, in roofing materials and/or in sealing sheeting.

DETAILED DESCRIPTION OF THE INVENTION

The present invention relates to a method for reducing odors including the steps of admixing active agents and a diluting agent to liquid crumb rubber modified bitumen, wherein the active agents comprise:

A: 20 to 60 wt.-% of aldehyde(s) selected from:
A1. alpha-hexyl cinnamaldehyde,
A2. 2-(4-tert.-butylbenzyl) propionaldehyde,
A3. 2-benzylidenheptanal,
or mixtures thereof,
B: 0 to 20 wt.-% of one or more other aldehydes having at least 10 carbon atoms in the molecule,
C: 10 to 40 wt.-% of one or more alcohols having a boiling point of at least 150° C.,
D: 0 to 20 wt.-% of one or more terpenes having a boiling point of at least 150° C.,
E: 0 to 10 wt.-% of ketone(s) having a boiling point of at least 150° C.,
F: 0 to 10 wt.-% of carbonic acid ester(s),
calculated on the total weight of active agents.

The weight percentages of components A to F are calculated on the total weight of active agents. The active agents used comprise components A to F; other active agents may be present. Preferably the active agents used contain components A to F, whereby the weight percentages of components A to F add up to 100%.

Preferably a mixture of active agents and diluting agent is admixed to the liquid CRMB. The steps of admixing active agents and diluting agent may thus be performed as a single step. The mixture preferably comprises 5 to 50 wt.-% active agents and 95 to 50 wt.-% of a diluting agent. Preferably the mixture is admixed to the liquid CRMB in amounts of from 50 to 400 ppm. This is preferably performed at temperatures above 140° C., in particular at temperatures between 150 and 250° C.

Crumb Rubber Modified Bitumen

The crumb rubber modified bitumen used in the method of the invention preferably is a crumb rubber modified bitumen composition comprising:
(a) 20 to 97 wt % bitumen;
(b) 3 to 80 wt % of crumb rubber;
calculated on the total weight of the crumb rubber modified bitumen composition.

The crumb rubber modified bitumen used in the method of the invention may be a composition as described in WO2010023173. These CRMB compositions show high storage stability. The crumb rubber modified bitumen may comprise 20 to 96 wt % bitumen; 3 to 80 wt % of crumb rubber; 0.1 to 10 wt % of a polymer comprising glycidyl functional groups; and 0.3 to 5 wt % of a wax, calculated up the total weight of the CRMB composition.

The bitumen in the crumb rubber modified bitumen composition may be a residue from the distillation or other means of processing crude oil, naturally occurring bitumen or a blend of various bitumen types. Examples of bitumen that may be conveniently used include distillation or "straight run" bitumen, precipitation bitumen, e.g. propane bitumen, oxidized or blown bitumen, naphthenic bitumen or mixtures thereof. The bitumen may be prepared by blending bitumen with flux oil, e.g. aromatic, naphthenic or paraffinic flux oil. The bitumen can also be derived from a natural oil sand source or can contain components of renewable origin. The penetration at 25° C. of the bitumen (as measured according to EN 1426) is preferably between 10 and 250. If the bitumen is a blend of bitumen and flux oil, the penetration is preferably between 10 and 250 after the flux oil has been blended with the bitumen.

The quantity of bitumen in the CRMB composition preferably is from 20 to 97 wt %, more preferably 20 to 96 wt %, even more preferably from 30 to 92 wt %.

The crumb rubber in the crumb rubber modified bitumen composition is any rubber in particle form. Preferably the crumb rubber is ground tire rubber. Preferably the mean average particle size is less than 5 mm, more preferably less than 2 mm and most preferably less than 1 mm. The crumb rubber may contain a synthetic elastomer such as polybutadiene or styrene-butadiene rubber, which may be obtained from tires of light vehicles. The crumb rubber may also be natural rubber, which may be obtained from tires of heavy vehicles. The quantity of crumb rubber in the bitumen composition preferably is from 3 to 80 wt %, more preferably from 6 to 70 wt %.

In one embodiment the crumb rubber modified bitumen composition comprises 0.1 to 10 wt % of a polymer comprising glycidyl functional groups. The polymer comprising glycidyl functional groups is preferably either a copolymer wherein at least some of the monomers are glycidyl-containing monomers, or is a grafted polymer wherein glycidyl-containing groups have been grafted onto a polymer backbone as described in WO2010023173.

In one embodiment the polymer preferably is a copolymer of ethylene and glycidyl acrylate or methacrylate, or a terpolymer of ethylene, alkyl acrylate or methacrylate and glycidyl acrylate or methacrylate.

In another embodiment the polymer preferably is a grafted polymer comprising glycidyl acrylate or methacrylate grafted onto a polyethylene backbone.

In one embodiment the crumb rubber modified bitumen composition comprises 0.3 to 5 wt % of a wax. The wax in the bitumen composition is preferably a paraffin wax, and is more preferably a wax resulting from a Fischer-Tropsch process. Preferably the paraffin wax comprises at least 90 wt % of straight chain alkanes. Preferably the alkane chain length is from $C_{30}$ to about $C_{100}$. Preferably the melting point of the paraffin wax is from 50 to 110° C., more preferably from 80 to 110° C. Alternatively the wax is ethylene bis-stearamide.

Diluting Agent

The invention relates to a method for reducing odors including the steps of admixing active agents and a diluting agent to liquid crumb rubber modified bitumen. The active agents and the diluting agent may be added separately. Preferably a mixture of the active agents and a diluting agent is admixed to the liquid CRMB. Hence, preferably the invention relates to a method including the step of admixing a mixture of active agents and a diluting agent to liquid crumb rubber modified bitumen.

The mixture preferably contains 5 to 50, in particular 10 to 40, wt.-% active agents and 95 to 50, in particular 90 to 60, wt.-% diluting agent.

Preferred diluting agents include mineral oils, i.e. hydrocarbon middle distillates, such as base oil, as well as vegetable oils such as sunflower oil which consists mainly of linoleic acid. Preferably the diluting agent is a mineral oil, more preferably a hydrocarbon middle distillate, or a vegetable oil, more preferably sunflower oil, or a mixture thereof. Preferably the diluting agent is a mixture of base oil and sunflower oil, preferably sunflower oil with a high flash point.

Active Agents

The aldehyde(s) of component A is/are selected from:
A1. alpha-hexyl ci nnamaldehyde (jasmonal H),
A2. 2-(4-tert.-butylbenzyl)propionaldehyde (Lilial),
A3. 2-benzylidene heptanal (jasminal),
or mixtures thereof.

In a particularly preferred embodiment, component A contains all three of the aldehydes specified above.

The other optional aldehyde(s) of component B is/are preferably selected from:
B1. 3-(4-iso-propylphenyl)-2-methylpropanal (cyclamaldehyde), particularly in amounts of from 2 to 12 wt.-%,
B2. 2-methylundecanal, particularly in amounts of from 2 to 8 wt.-%,
B3. 2-methyl-3-(3,4-methylene-dioxyphenyl)propanal (helional), particularly in amounts of from 0.5 to 5 wt.-%, or mixtures thereof.

In a particularly preferred embodiment, component B contains all three of the aldehydes specified above. Moreover, the aldehydes listed in EP1235768A are also well-suited. The amounts of benzaldehyde and citral that are present should preferably be at most 5 wt.-%.

Preferably, naturally occurring alcohol(s) is/are used as component C. The alcohol(s) is/are preferably selected from:
C1. linalol having a boiling point of 198 0C, particularly in amounts of from 5 to 25 wt.-%,
C2. eugenol having a boiling point of 253 *C, particularly in amounts of from 3 to 12 wt.-%,
C3. geraniol having a boiling point of 230 "C, particularly in amounts of from 3 to 12 wt.-%,
C4. alpha-terpineol having a boiling point of 219° C., particularly in amounts of from 0.5 to 5 wt.-%, or mixtures thereof.

In a particularly preferred embodiment, component C contains all four of the alcohols specified above. Other alcohols, such as vanillin and thymol, are also well-suited.

The optional terpene(s) of component D is/are preferably selected from:
D1. limonene having a boiling point of 176° C., particularly in amounts of from 0.5 to 5 wt.-%,
D2. alpha-pinene having a boiling point of 156° C., particularly in amounts of from 0.5 to 5 wt.-%, or mixtures thereof.

In a particularly preferred embodiment, component D contains both of the terpenes specified above. Terpenes that are present in natural essential oils as well as the terpenes listed in WO2004099352A are also well suited.

Well-suited as ketones in optional component E are e.g.: benzophenone, butyl methyl-ketone, and 1,8-cineol, as well as other ketones that are present in natural essential oils. The ketones listed in WO2004099352A are also well-suited.

Well-suited as carbonic acid esters of optional component F are e.g.: benzylsalicylate, amylbutyrate, ethylbutyrate, and amylacetate, as well as other carbonic acid esters listed in EP1235768A (WO0136354A1).

Applications

The invention further relates to crumb rubber modified bitumen compositions as obtained by the method of the invention.

The invention also relates to the use of a crumb rubber modified bitumen composition as obtained by the invention in road surfacing and road base materials, in insulating layers for buildings, especially insulating layers against the penetration of water and moisture into buildings, in roofing materials such as roofing membranes, felts and shingles and/or in sealing sheeting. In all said applications, CRMB preferably is processed in liquefied form.

Crumb rubber modified bitumen compositions prepared according to the method of the invention, optionally diluted with further bitumen, are suitably used to prepare asphalt mixtures that can be used in paving applications. Therefore, the invention further provides an asphalt mixture comprising a CRMB composition according to the invention and further comprising aggregate. The aggregate may consist of filler, sand and/or stones.

EXAMPLES

The invention will now be illustrated by the following examples.

Example 1

When processing liquid CRMB without admixing active agents and a diluting agent, a very strong smell was noticed. The odor can be compared to the odor of burnt tires.

The admixture of a mixture comprising 5 to 50 wt.-% active agents and 95 to 50 wt.-% of a diluting agent reduced the odor.

The addition of 0.14 gram mixture to 2 kg of CRMB (i.e. 70 ppm) at a temperature of 185° C. decreased the odor.

The addition of 0.28 gram mixture to 2 kg of CRMB (i.e. 140 ppm) at a temperature of 185° C. decreased the odor significantly.

The addition of 0.42 gram mixture to 2 kg of CRMB (i.e. 210 ppm) at a temperature of 185° C. decreased the odor so much that the CRMB smelled like bitumen without crumb rubber.

That which is claimed is:

1. A method for reducing odors including the steps of admixing active agents and a diluting agent to liquid crumb rubber modified bitumen, wherein the active agents comprise:
   A: 20 to 60 wt.-% of aldehyde(s) selected from:
      A1. alpha-hexyl cinnamaldehyde,
      A2. 2-(4-tert.-butylbenzyl) propionaldehyde,
      A3. 2-benzylidenheptanal,
      or mixtures thereof,
   B: 0 to 20 wt.-% of one or more other aldehydes having at least 10 carbon atoms in the molecule,
   C: 10 to 40 wt.-% of one or more alcohols having a boiling point of at least 150° C.,
   D: 0 to 20 wt.-% of one or more terpenes having a boiling point of at least 150° C.,
   E: 0 to 10 wt.-% of ketone(s) having a boiling point of at least 150° C.,
   F: 0 to 10 wt.-% of carbonic acid ester(s), calculated on the total weight of active agents;
   wherein 210 to 400 ppm of a mixture of 5 to 50 wt.-% active agents and 95 to 50 wt.-% of a diluting agent is admixed with a liquid crumb rubber modified bitumen composition.

2. The method according to claim 1, wherein the diluting agent is a mineral oil.

3. The method according to claim 1, wherein the liquid crumb rubber modified bitumen composition comprises:
   (a) 20 to 96 wt % bitumen;
   (b) 3 to 80 wt % of crumb rubber;
   calculated on the total weight of the crumb rubber modified bitumen composition.

4. The method according to claim 1, wherein the liquid crumb rubber modified bitumen composition comprises:
(a) 20 to 96 wt % bitumen;
(b) 3 to 80 wt % of crumb rubber;
(c) 0.1 to 10 wt % of a polymer comprising glycidyl functional groups; and
(d) 0.3 to 5 wt % of a wax;
calculated on the total weight of the crumb rubber modified bitumen composition.

5. The method of claim 1, wherein component B is selected from:
B1. 3-(4-iso-propylphenyl) 2-methylpropanal,
B2. 2-methylundecanal,
B3. 2-methyl-3-(3,4-methylene-dioxyphenyl)-propanal,
or mixtures thereof.

6. The method of claim 1, wherein component C is selected from:
C1. linalool,
C2. eugenol,
C3. geraniol,
C4. alpha-terpineol,
or mixtures thereof.

7. The method of claim 1, wherein component D is selected from:
D1. limonene,
D2. alpha-pinene,
or mixtures thereof.

8. The method of claim 4, wherein the polymer comprising glycidyl functional groups is a copolymer of ethylene and glycidyl acrylate or methacrylate, or a terpolymer of ethylene, alkyl acrylate or methacrylate and glycidyl acrylate or methacrylate.

9. The method of claim 4, wherein the polymer comprising glycidyl functional groups is a grafted polymer comprising glycidyl acrylate or methacrylate grafted onto a polyethylene backbone.

10. The method of claim 4, wherein the wax is a paraffin wax resulting from a Fischer-Tropsch process, or ethylene bis-stearamide.

11. A crumb rubber modified bitumen composition as obtained by claim 1.

12. The method according to claim 1, wherein the diluting agent comprises a hydrocarbon middle distillate.

13. The method according to claim 1, wherein the diluting agent comprises a vegetable oil.

* * * * *

UNITED STATES PATENT AND TRADEMARK OFFICE
CERTIFICATE OF CORRECTION

| | | |
|---|---|---|
| PATENT NO. | : 11,274,208 B2 | Page 1 of 1 |
| APPLICATION NO. | : 16/340754 | |
| DATED | : March 15, 2022 | |
| INVENTOR(S) | : Jacques Colange et al. | |

It is certified that error appears in the above-identified patent and that said Letters Patent is hereby corrected as shown below:

On the Title Page

In item (57), in Column 2, in "Abstract", Line 5, delete "tert." and insert -- tert --.

In the Specification

In Column 5, Line 3, delete "ci nnamaldehyde" and insert -- cinnamaldehyde --.

In Column 5, Lines 11-12, delete "cyclamaldehyde" and insert -- cyclamen aldehyde --.

Signed and Sealed this
Seventeenth Day of May, 2022

Katherine Kelly Vidal
*Director of the United States Patent and Trademark Office*